United States Patent
Moshe et al.

(10) Patent No.: US 11,531,498 B2
(45) Date of Patent: Dec. 20, 2022

(54) PEER STORAGE DEVICE MESSAGING OVER CONTROL BUS

(71) Applicant: Western Digital Technologies, Inc., San Jose, CA (US)

(72) Inventors: Eran Moshe, Kfar Saba (IL); Danny Berler, Tel-Mond (IL); Daniel Helmick, Broomfield, CO (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 17/176,461

(22) Filed: Feb. 16, 2021

(65) Prior Publication Data
US 2022/0164139 A1 May 26, 2022

Related U.S. Application Data

(60) Provisional application No. 63/116,287, filed on Nov. 20, 2020.

(51) Int. Cl.
*G06F 3/06* (2006.01)
*G06F 11/14* (2006.01)

(52) U.S. Cl.
CPC ............ *G06F 3/0659* (2013.01); *G06F 3/061* (2013.01); *G06F 3/067* (2013.01); *G06F 3/0619* (2013.01); *G06F 3/0629* (2013.01); *G06F 3/0653* (2013.01)

(58) Field of Classification Search
None
See application file for complete search history.

(56) References Cited

U.S. PATENT DOCUMENTS

| | | | |
|---|---|---|---|
| 7,117,211 B2 | 10/2006 | Whittingham et al. | |
| 7,177,211 B2 | 2/2007 | Zimmerman | |
| 7,783,777 B1* | 8/2010 | Pabla | G06F 16/1834 |
| | | | 709/239 |
| 8,239,597 B2 | 8/2012 | Wishneusky | |
| 9,025,495 B1 | 5/2015 | Brown et al. | |
| 9,448,614 B2 | 9/2016 | Slik | |
| 10,481,990 B2 | 11/2019 | Eder et al. | |
| 10,580,512 B2 | 3/2020 | Subramanian et al. | |
| 2001/0044879 A1 | 11/2001 | Moulton et al. | |
| 2003/0163599 A1 | 8/2003 | Hills et al. | |

(Continued)

OTHER PUBLICATIONS

Jones, M., Digital Power Management, Analog Devices, https://www.analog.com/ru/technical-articles/digital-power-management.html. Retrieved Aug. 10, 2020 (8 pages).

(Continued)

*Primary Examiner* — Christopher D Birkhimer
*Assistant Examiner* — Ralph A Verderamo, III
(74) *Attorney, Agent, or Firm* — Patent Law Works LLP

(57) ABSTRACT

Systems and methods for peer storage device messaging over a control bus to offload and back up internal operation data are disclosed. Storage devices may include a host interface configured to connect to a host system and a control bus interface to connect to a control bus. Peer storage devices may establish peer communication through the control bus interface, select internal operation data, and send the internal operation data to other peer storage devices through the control bus. Responsive to a recovery event, peer storage devices may receive the offloaded internal operation data from another peer storage device.

20 Claims, 7 Drawing Sheets

(56) References Cited

U.S. PATENT DOCUMENTS

| | | |
|---|---|---|
| 2005/0055602 A1 | 3/2005 | Werner et al. |
| 2008/0256292 A1* | 10/2008 | Flynn .................... G06F 13/426 |
| | | 711/E12.04 |
| 2009/0030986 A1* | 1/2009 | Bates ................. G06F 11/2074 |
| | | 709/205 |
| 2010/0088531 A1* | 4/2010 | Gao ...................... G06F 1/3203 |
| | | 713/323 |
| 2010/0124196 A1* | 5/2010 | Bonar ................... H04W 16/16 |
| | | 455/445 |
| 2010/0165896 A1 | 7/2010 | Gong et al. |
| 2012/0066439 A1 | 3/2012 | Fillingim |
| 2020/0042380 A1 | 2/2020 | Roberts |
| 2020/0042390 A1 | 2/2020 | Roberts |
| 2020/0257590 A1* | 8/2020 | Bolkhovitin .......... H04L 67/104 |
| 2020/0327018 A1 | 10/2020 | Park et al. |
| 2021/0149757 A1* | 5/2021 | Ozturk ................ G06F 11/0745 |

OTHER PUBLICATIONS

International Search Report and Written Opinion for International Application No. PCT/US2021/031955, dated Jul. 28, 2021, 21 pgs.
International Search Report and Written Opinion for International Application No. PCT/US2021/031962, dated Aug. 4, 2021, 9 pgs.

\* cited by examiner

PEER STORAGE DEVICE MESSAGING OVER CONTROL BUS

TECHNICAL FIELD

The present disclosure generally relates to computing system devices interconnected through a low-bandwidth bus and, more particularly, to peer device communication through a low-bandwidth control bus without host system intervention.

BACKGROUND

Some computing systems, such as storage arrays, may include multiple storage devices supporting one or more host systems through a peripheral or storage interface bus, such as peripheral component interconnect express (PCIe), serial advanced technology attachment (SATA), or serial attached [small computer serial interface (SCSI)] (SAS). These interfaces may be configured for high-bandwidth transfer rates, such as 3 gigabits (Gb)/second (s), 6 Gb/s, 8 Gb/s, 12 Gb/s, 16 Gb/s, etc., to enable fast and reliable data transfer to and from storage devices, with some versions supporting as high as 512 Gb/s.

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Each storage device in a multi-device storage system may be connected to a host system through at least one high-bandwidth interface, such as PCIe, using an appropriate storage protocol for the storage device, such as non-volatile memory express (NVMe) for accessing solid state drives (SSDs) or the storage blades of all flash arrays. Some multi-device storage systems employ storage devices capable of communicating with one another and/or host systems over the interconnecting fabric and/or network fabric through the high-bandwidth interface. Such fabric-based distributed storage systems may include storage devices configured with direct memory access to enable more efficient transfer of data to and from hosts and other systems.

In some configurations, each storage device may also include another interface that is configured for power management and/or low-bandwidth communication with computing devices sharing the same utility or control bus. For example, storage devices may include a control bus interface that complies with inter-integrated circuit (I2C), improved inter-integrated circuit (I3C), system management bus (SMBus), or similar low-bandwidth control bus protocols. These command buses may interconnect the storage devices within a multi-device storage system and provide a synchronous, multi-master, packet switched, serial communication bus. In some computing systems, control bus pins may be included as part of the physical peripheral interface connector. So, for example, a PCIe physical interface connector may include a set of I2C, I3C, or SMBus pins at one end of the connector for providing the low-bandwidth control interface. For comparison to the high-bandwidth peripheral interfaces used for data transfer, these low-bandwidth control bus interfaces may support ~3-30 megabits (Mb)/s and may operate as low as 100 kilobits (kb)/s.

In some systems, the low-bandwidth control bus may be initialized for communication early in the boot cycle of the storage devices to assist with power management, discovery, and access to external resources, such as temperature sensors, fan controllers, light emitting diode (LED) indicators, etc. Storage devices may have access to the control bus before host communication or control is established through the high-bandwidth peripheral bus.

Storage devices may encounter errors prior to establishing host communication through the high-bandwidth peripheral bus and/or experience failures that prevent host communication. As a result, internal operation data, such as reset events, debug data, device logs, and configuration information, in individual storage devices may be lost, particularly in the event of an unrecoverable error that forces a system or storage device reset.

Offloading and/or backing up internal operation data without waiting for or relying on the host system may be advantageous. A reliable way of offloading internal operation data during pre-host operations and/or without relying on peripheral or storage bus communications with the host may be needed.

SUMMARY

Various aspects for peer storage device communication, particularly messaging among peer storage devices over a low-bandwidth control bus for offloading or backup of internal operation data, are described.

One general aspect includes a system that includes a first device that may include: a processor; a memory; a host interface configured to connect to a host system; a control bus interface configured to connect to a control bus, where a plurality of peer devices are configured to connect to the control bus; and a peer sharing service. The peer sharing service may be configured to: establish, through the control bus interface, peer communication with a target peer device from the plurality of peer devices; select internal operation data for the first device; send the selected internal operation data to the target peer device; and receive, responsive to a recovery event, the selected internal operation data from the target peer device.

Implementations may include one or more of the following features. The first device may further include: a storage medium configured to store host data received through the host interface; a storage interface protocol configured for communication with the host system through the host interface; and a non-volatile memory device controller configured to manage data input/output to the storage medium. The storage medium may include at least one non-volatile memory device. The storage interface protocol may be a non-volatile memory express (NVMe) protocol. The plurality of peer devices may include a plurality of peer storage devices and each peer storage device of the plurality of peer storage devices may include: a peer host interface configured to connect to the host system using the NVMe protocol; a peer storage medium may include at least one non-volatile memory; and a peer control bus interface configured to connect to the control bus. The peer sharing service may further include a discovery service configured to: broadcast, through the control bus interface, a device identifier for the first device; receive, through the control bus interface, peer device identifiers from the plurality of peer devices; and store the peer device identifiers in a peer device registry. The peer sharing service may be further configured to: determine a peer device identifier for the target peer device; and format a peer message including the selected internal operation data as a message payload. Sending the selected internal operation data may include sending, using the peer device identifier for addressing, the peer message to the target peer device. The peer sharing service may further include an encryption service configured to encrypt, prior to sending the peer message, the selected internal operation data. The internal operation data may be selected from: reset event data; debug data; device operation log data; or last good configuration data. The peer sharing service may be further configured to: receive, through the control bus interface, peer internal operation data from at least one peer device of the plurality of peer devices; store the peer internal operation data in a peer data partition in the memory; and send, responsive to a peer recovery event, the peer internal operation data to the at least one peer device. The system may further include the plurality of peer devices, where the plurality of peer devices store the internal operation data received from the first device and the peer sharing service may further include a recovery service configured to: determine the recovery event; send, responsive to the recovery event and through the control bus interface, a recovery request to at least one peer device from the plurality of peer devices; receive, from the at least one peer device, recovery internal operation data; and store, in an internal operation memory location, the recovery internal operation data. The recovery event may occur in a pre-host operation state. The recovery internal operation data may include a last good configuration data page and the first device may be further configured to complete pre-host operations using the last good configuration data page received from the at least one peer device.

Another general aspect includes a computer-implemented method: establishing, from a first device, peer communication with a target peer device from a plurality of peer devices, where the first device and each peer device of the plurality of peer devices include: a host interface configured to connect to a host system and a control bus interface configured to connect to a control bus; selecting internal operation data for the first device; sending, from the first device and through the control bus interface, the selected internal operation data to the target peer device; and receiving, to the first device and through the control bus interface, the selected internal operation data from the target peer device, where receiving the selected internal operation data is responsive to a recovery event.

Implementations may include one or more of the following features. The first device and each peer device of the plurality of peer devices may include: a storage medium configured to store host data received through the host interface; a storage interface protocol configured for communication with the host system through the host interface; and a non-volatile memory device controller configured to manage data input/output to the storage medium. The computer-implemented method may further include: broadcasting, through the control bus interface, a device identifier for the first device; receiving, through the control bus interface, peer device identifiers from the plurality of peer devices; and storing, in the first device, the peer device identifiers in a peer device registry. The computer-implemented method may further include: determining, by the first device, a peer device identifier for the target peer device; and formatting a peer message including the selected internal operation data as a message payload, where sending the selected internal operation data includes sending, using the peer device identifier for addressing, the peer message to the target peer device. The computer-implemented method may further include encrypting, prior to sending the peer message, the selected internal operation data. The internal operation data may be selected from: reset event data; debug data; device operation log data; or last good configuration data. The computer-implemented method may include: receiving, at the first device and through the control bus interface, peer internal operation data from at least one peer device of the plurality of peer devices; storing, in a memory of the first device, the peer internal operation data in a peer data partition in the memory; and sending, by the first device and responsive to a peer recovery event, the peer internal operation data to the at least one peer device. The computer-implemented method may further include: determining, by the first device, the recovery event; sending, responsive to the recovery event and through the control bus interface, a recovery request to at least one peer device from the plurality of peer devices; receiving, from the at least one peer device and through the control bus interface, recovery internal operation data; and storing, in an internal operation memory location, the recovery internal operation data. The computer-implemented method may further include completing, by the first device, pre-host operations using a last good configuration data page received from the target peer device, where the recovery event occurs in a pre-host operation state and the selected internal operation data includes the last good configuration data page.

Still another general aspect includes a storage system that includes a control bus and a plurality of peer storage devices, where each peer storage device of the plurality of peer storage devices may include: a processor; a memory; a host interface configured to connect to a host system; a control bus interface configured to connect to the control bus; means for establishing, through the control bus interface, peer communication among the plurality of peer storage devices; means for selecting internal operation data from an internal operation memory location; means for sending the selected internal operation data to at least one other peer storage device in the plurality of peer storage device; and means for receiving, responsive to a recovery event, the selected internal operation data from the at least one other peer storage device in the plurality of peer storage devices.

The various embodiments advantageously apply the teachings of storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve the communication and backup of internal operation data, such as by using peer messaging over a control bus among storage devices. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
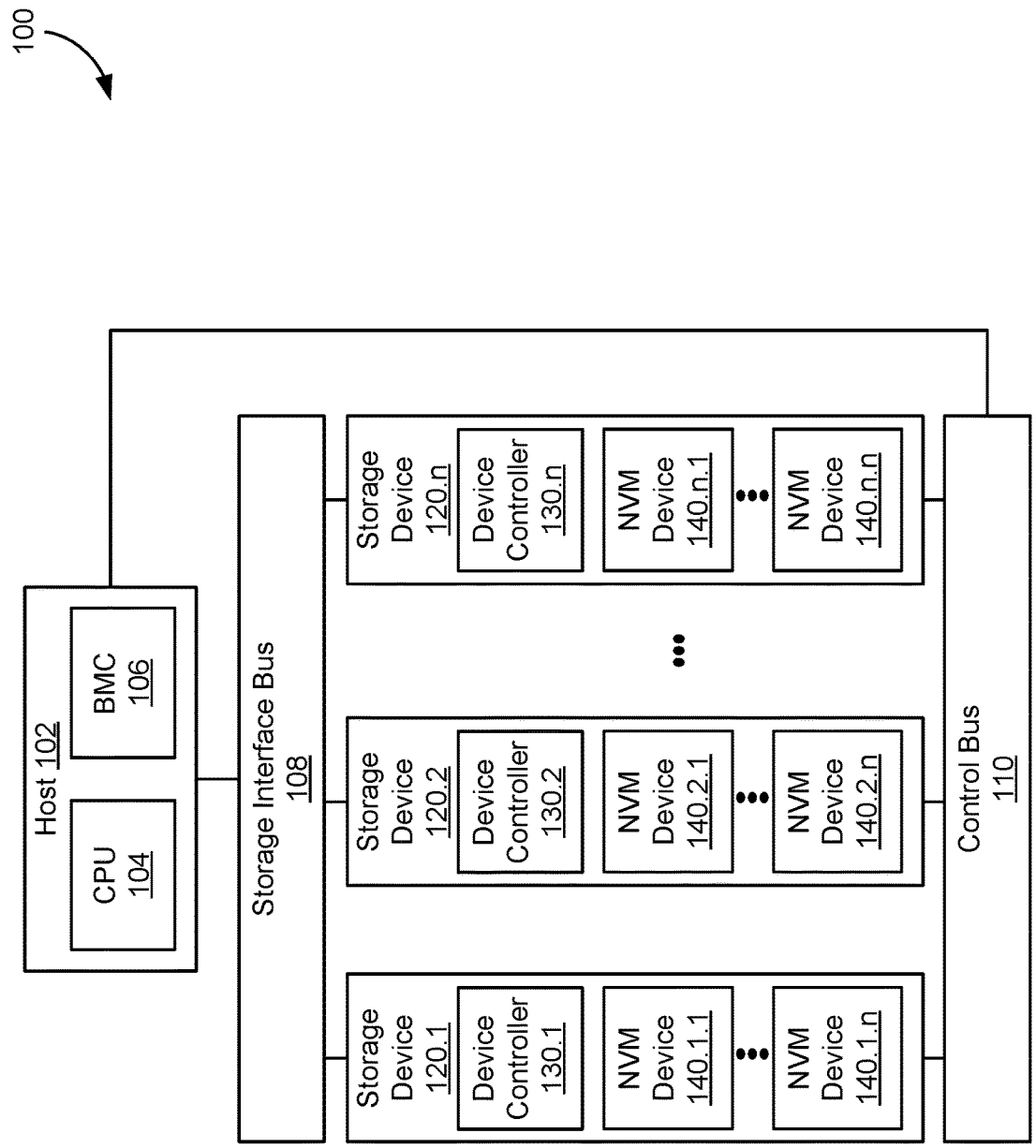
FIG. 1 schematically illustrates a multi-device storage system with a storage interface bus and a control bus.

FIG. 1 shows an embodiment of an example data storage system 100 with data storage devices 120 interconnected by both storage interface bus 108 and control bus 110. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, disk drives, or drives). In some embodiments, storage devices 120 may be configured in a server or storage array blade or similar storage unit for use in data center storage racks or chassis. Storage devices 120 may interface with one or more hosts 102 and provide data storage and retrieval capabilities for or through those host systems. In some embodiments, storage devices 120 may be configured in a storage hierarchy that includes storage nodes, storage controllers, and/or other intermediate components between storage devices 120 and host 102. For example, each storage controller may be responsible for a corresponding set of storage nodes and their respective storage devices connected through a corresponding backplane network, though only storage devices 120 and host 102 are shown.

In the embodiment shown, a number of storage devices 120 are attached to a common storage interface bus 108 for host communication. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 102. In some embodiments, storage interface bus 108 may provide the primary host interface for storage device management and host data transfer, and control interface bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of host 102. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, storage devices 120 may be configured for peer communication using multi-master discovery and messaging compliant with a low-bandwidth interface standard. For example, storage devices 120 may be configured for packet-based messaging through control bus 110 using a low-bandwidth bus protocol, such as inter-integrated circuit (I2C), improved inter-integrated circuit (BC), system management bus (SMBus), etc. Storage devices 120 may be interconnected by a common control bus to provide a low-bandwidth communication channel with host 102 and other system components to assist with power management, discovery, and access to external resources, such as temperature sensors, fan controllers, light emitting diode (LED) indicators, etc. For example, control bus 110 may connect storage devices 120 to a baseboard management controller (BMC) for monitoring the physical state of storage devices 120 for host 102. Storage devices 120 may be defined as peer storage devices based on their connection to a shared control bus 110.

In some embodiments, data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, host or host system 102 may be coupled to data storage system 100 through a network interface that is part of host fabric network that includes storage interface bus 108 as a host fabric interface. In some embodiments, multiple host systems 102 (only one of which is shown in FIG. 1) are coupled to data storage system 100 through the fabric network, which may include a storage network interface or other interface capable of supporting communications with multiple host systems 102. The fabric network may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks.

Host system 102, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host system 102 is sometimes called a host, client, or client system. In some embodiments, host system 102 is a server system, such as a server system in a data center, or a storage system, such as a storage array in a data center. In some embodiments, the one or more host systems 102 are one or more host devices distinct from a storage controller or storage node housing the plurality of storage devices 120. The one or more host systems 102 may be configured to store and access data in the plurality of storage devices 120.

Host system 102 may include one or more central processing units (CPUs) 104 for executing compute operations or instructions for accessing storage devices 120 through storage interface bus 108. In some embodiments, CPU 104 may include a processor and be associated with operating memory (not shown) for executing both storage operations and a storage interface protocol compatible with storage interface bus 108 and storage devices 120. In some embodiments, a separate storage interface unit (not shown) may provide the storage interface protocol and related processor and memory resources. From the perspective of storage devices 120, storage interface bus 108 may be referred to as a host interface bus and provides a host data path between storage devices 120 and host 102.

Host system 102 may include a BMC 106 configured to monitor the physical state of host 102, storage devices 120, and/or other components of data storage system 100. In some embodiments, BMC 106 may include processor, memory, sensor, and other resources integrated in BMC 106 and/or accessible over control bus 110. BMC 106 may be configured to measure internal variables within a housing, adjacent components, and/or from the components themselves within host 102 or data storage system 100, such as temperature, humidity, power-supply voltage, fan speeds, communication parameters, and/or operating system (OS) functions. BMC 106 may enable systems and components to be power cycled or rebooted as needed through control signals over control bus 110. In some embodiments, BMC 106 may be configured to receive status communication from storage devices 120 through control bus 110 during boot cycles, prior to initialization of host communication through storage interface bus 108.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
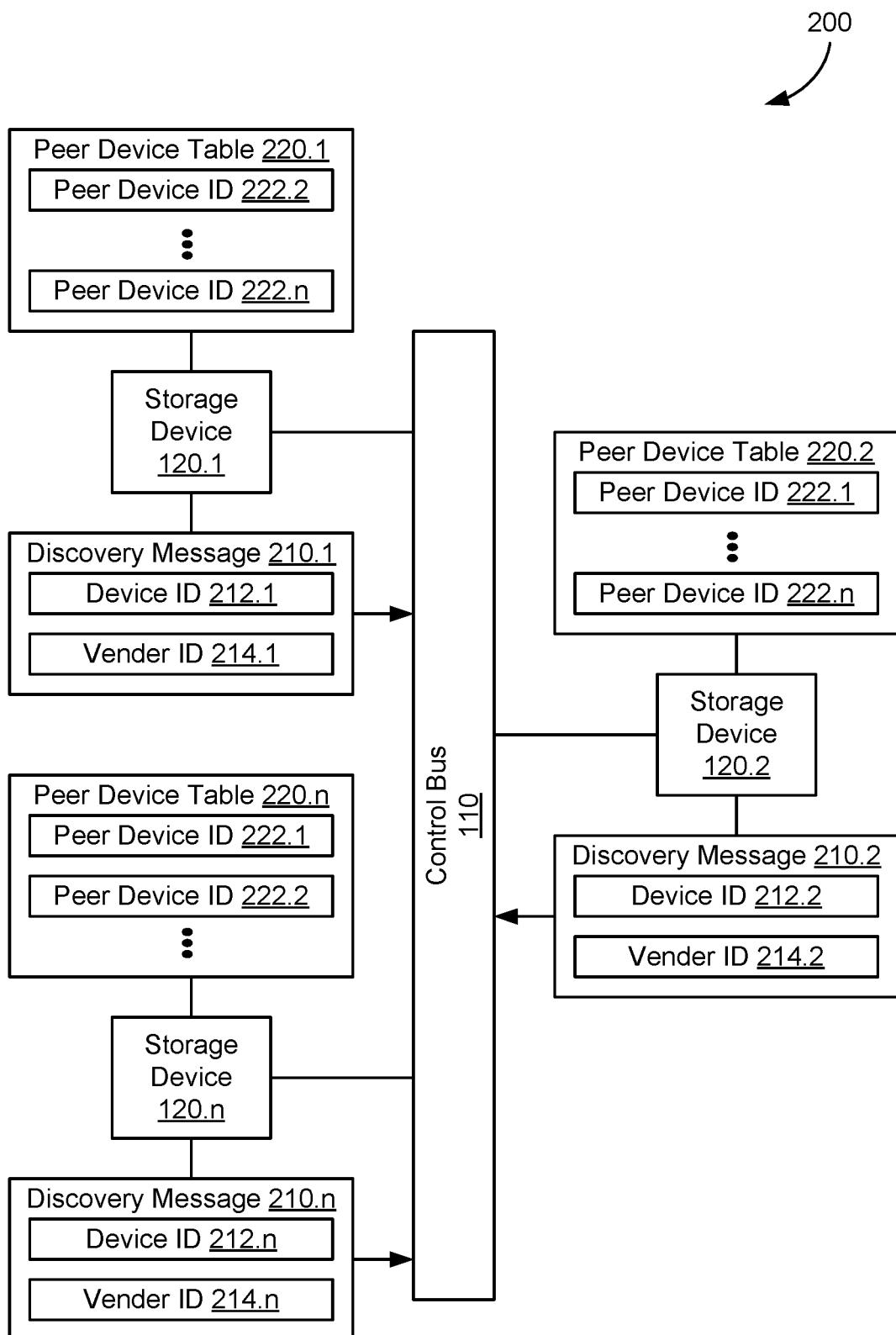
FIG. 2 schematically illustrates a peer discovery architecture that may be used by the multi-device storage system of FIG. 1.

FIG. 2 shows a schematic representation of an example storage system 200, such as multi-device data storage system 100 in FIG. 1, configured with a peer discovery architecture to support peer messaging through control bus 110. Storage devices 120 may each be connected to control bus 110 for low-bandwidth communication with a low-level physical management and power control subsystem, such as BMC 106 in FIG. 1. In some embodiments, control bus 110 supports a multi-master, packet-based messaging system that may enable storage devices 120.1 to establish communication with peer storage devices through control bus 110, in addition to their communication with BMC 106 or other system components. Peer messaging through control bus 110 may be independent of any communication through a primary host interface or fabric interface, such as storage interface bus 108 in FIG. 1.

Each peer storage device 120.1-120.n connected to control bus 110 may be configured to initiate a discover message 210. Discovery message 210 may be broadcast to control bus 110 during start up or initialization. For example, storage device 120 may use the control bus protocol to establish priority or temporary master control of control bus 110 and send a broadcast message that is received by all other devices connected to control bus 110. Storage device 120.1 may thereby send discovery message 210.1 to storage devices 120.2-120.n and each peer storage device may do the same in turn during a system initialization, power cycle, or reboot. Each peer storage device 120 connected to control bus 110 may receive a discovery message from each other peer storage device 120.

In some embodiments, discovery message 210 may include a device identifier 212 and a vender identifier 214. Device identifier 212 may include a unique identifier for that storage device relative to all other devices connected to control bus 110. In some embodiments, device identifier 212 may include a product serial number and/or a unique address assigned to the particular storage device. For example, each device connected to control bus 110 may be assigned a 7 bit address that uniquely identifies that device on control bus 110. Messages intended for that storage device will include the address in the message sequence and only the storage device with the matching address will process the content of the message. Messages may also be sent with a reserved broadcast or general call address for the message to be received and processed by all devices.

Vender identifier 214 may include a group identifier that designates storage devices meeting a specific set of criteria, such as storage devices manufactured or sold by a particular company or configured in accordance with a specific peer messaging protocol or standard. For example, vender identifier 214 may include a numeric identifier for storage devices from a specific vendor that are enabled for peer messaging over the control bus. Vendor identifiers may be defined and assigned by particular manufacturers, in accordance with working group or standard agreement, or through other means to assure that vendor identifiers are unique and serve to properly identify storage devices compatible with specific peer messaging protocols and content.

In some embodiments, each storage device 120 may use discovery messages 210 received from peer storage devices to populate an internal data structure for storing the addresses of one or more peer storage devices. For example, each storage device 120 may maintain peer device table 220 in an internal memory location to list the addresses, device identifiers 212, and/or vendor identifiers 214 of each other peer storage device attached to control bus 110. In some embodiments, peer device table 220 may include a series, list, or array, of peer device identifier entries 222. For example, each time a discovery message with a different device identifier 212 is received (and includes a corresponding vendor identifier 214 that denotes the device as a peer storage device for messaging purposes), that device identifier 212 may be entered in peer device table 220 as a new peer device identifier entry 222. After all discovery messages 210 have been received, each storage device 120 may include a complete peer device table 220 with the information necessary to send messages to each other peer storage device over control bus 110.

Figure 3:
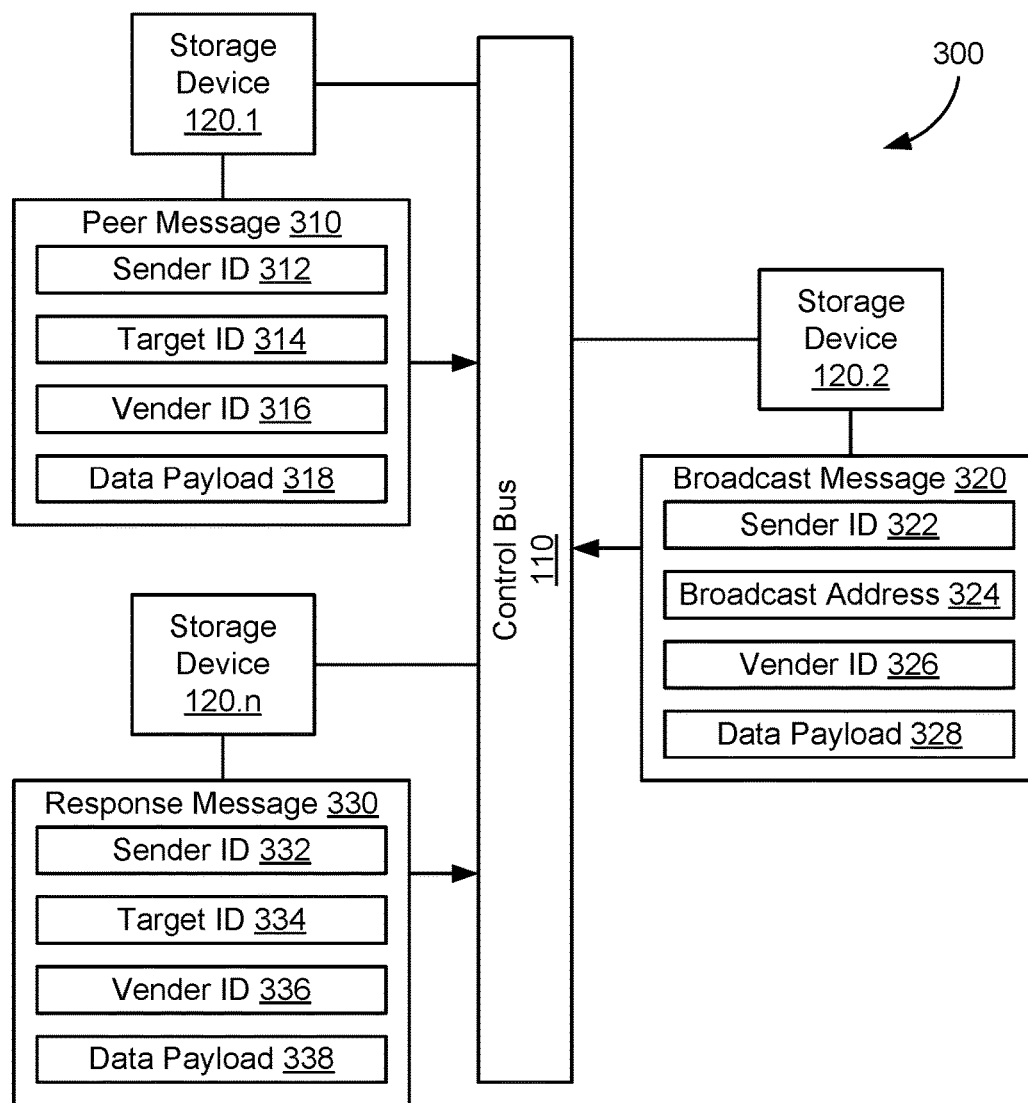
FIG. 3 schematically illustrates a peer messaging architecture that may be used by the multi-device storage system of FIG. 1.

FIG. 3 shows a schematic representation of an example storage system 300, such as multi-device data storage system 100 in FIG. 1, configured with a peer message architecture to support various types of peer messages 310, 320, 330 through control bus 110. Storage devices 120 may each be connected to control bus 110 for low-bandwidth communication with a low-level physical management and power control subsystem, such as BMC 106 in FIG. 1. In some embodiments, control bus 110 supports a multi-master, packet-based messaging system that may enable storage devices 120.1 to establish communication with peer storage devices through control bus 110, in addition to their communication with BMC 106 or other system components connected to control bus 110. For example, each storage device may be able to request or assert master control or priority in order to send messages through control bus 110 to peer storage devices operating as slaves. Peer messaging through control bus 110 may be independent of any communication through a primary host interface or fabric interface, such as storage interface bus 108 in FIG. 1.

Each peer storage device 120.1-120.n connected to control bus 110 may be configured to initiate one or more messages 310, 320, 330 using addresses and message syntax supported by control bus 110. While each example message is shown coming from a particular storage device 120, each storage device 120 may be configured to use any or all of the message types. Peer message 310 may be used by storage devices 120 to send direct messages to a target peer storage device, such as a message containing selected internal operation data for offload or backup and/or requesting previously stored internal operation data for recovery. Broadcast message 320 may be used by storage devices 120 to send messages to all peer storage devices at once, such as a message containing internal operation data to be redundantly stored or requesting recovery of previously stored internal operation data where more than one peer storage device may contain the needed data. Response message 330 may be used by storage devices 120 to send messages back to a peer storage device that has requested data, such as responding to a recovery request by sending the requested internal operation data. Note that response message 330 includes data payload and, in some embodiments, may require the sending storage device to have master control or priority and may be distinguished from simple acknowledgement messages that may be part of the slave's message handling protocol.

In some embodiments, peer message 310 may include a sender identifier 312, a target identifier 314, a vender identifier 316, and a data payload 318. For example, sender identifier 312 may include the device identifier for the sending storage device and/or control bus address of the sending storage device. Target identifier 314 may include the device identifier for the target storage device and/or control bus address of the target storage device. In some embodiments, target identifier 314 may include a device identifier that is separate from the control bus address used by devices on control bus 110 to determine the target device. Vender identifier 316 may include a vender identifier as described above with regard to vender identifiers 214 in FIG. 2. Data payload 318 may include data generated by the sending storage device, such as storage device 120.1, to be stored by the target peer storage device. For example, data payload 318 may include internal operation data identified for offload or backup on other storage devices. In some embodiments, data payload 318 may include recovery parameters describing previously offloaded or stored data that is needed by the sending storage device for data recovery, such as recovering lost event logs, debug data, or last good page data.

In some embodiments, broadcast message 320 may include a sender identifier 322, a broadcast address 324, a vender identifier 326, and a data payload 328. For example, sender identifier 322 may include the device identifier for the sending storage device and/or control bus address of the sending storage device. Broadcast address 324 may include a reserved address, header tag, or similar identifier to denote a broadcast message that should be sent to all devices on control bus 110. Vender identifier 326 may include a vender identifier as described above with regard to vender identifiers 214 in FIG. 2. Data payload 328 may include data generated by the sending storage device, such as storage device 120.1, to be stored by one or more peer storage devices. For example, data payload 328 may include internal operation data identified for offload or backup on other storage devices. In some embodiments, data payload 318 may include recovery parameters describing previously offloaded or stored data that is needed by the sending storage device for data recovery, such as recovering lost event logs, debug data, or last good page data.

In some embodiments, response message 330 may include a sender identifier 332, a target identifier 334, a vender identifier 336, and a data payload 338. Response message 330 may differ from peer message 310 in that it may be responsive to receipt of peer message 310. For example, peer message 310 may include a recovery request that includes parameters describing previously stored internal operation data and response message 330 may respond to peer message 310 with the requested recovery data. Sender identifier 332 may include the device identifier for the sending storage device and/or control bus address of the sending storage device. Target identifier 334 may include the device identifier for the target storage device and/or control bus address of the target storage device, generally the storage device from which the recovery request was received. Vender identifier 336 may include a vender identifier as described above with regard to vender identifiers 214 in FIG. 2. Data payload 338 may include data previously stored by the sending storage device from and about the requesting storage device, which may now be the target peer storage device for response message 330. For example, data payload 318 may include internal operation data identified for recovery to the target storage device that requested the recovery data.

Figure 4:
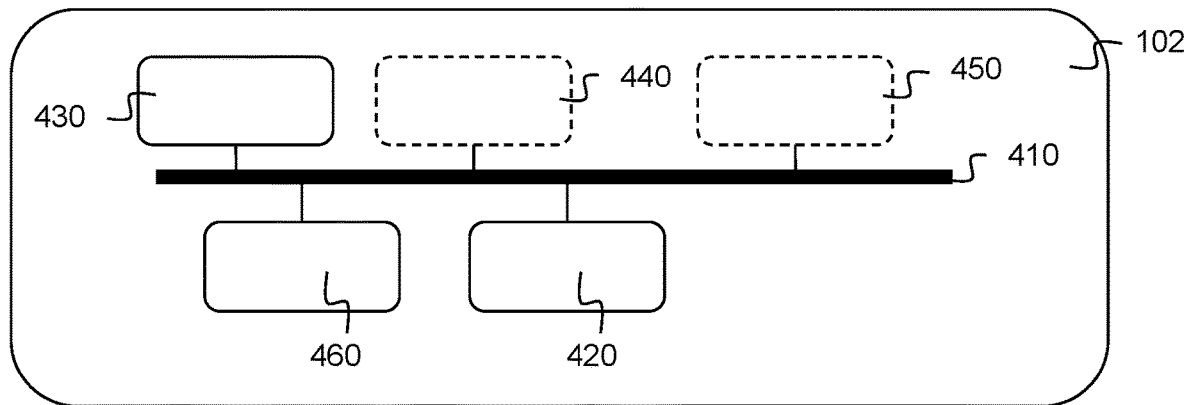
FIG. 4 schematically illustrates a host node of the multi-device storage system of FIG. 1.

FIG. 4 shows a schematic representation of an example host system 102. Host system 102 may comprise a bus 410, a processor 420, a local memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 102 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a PCIe interface for connecting to storage devices 120.

Figure 5:
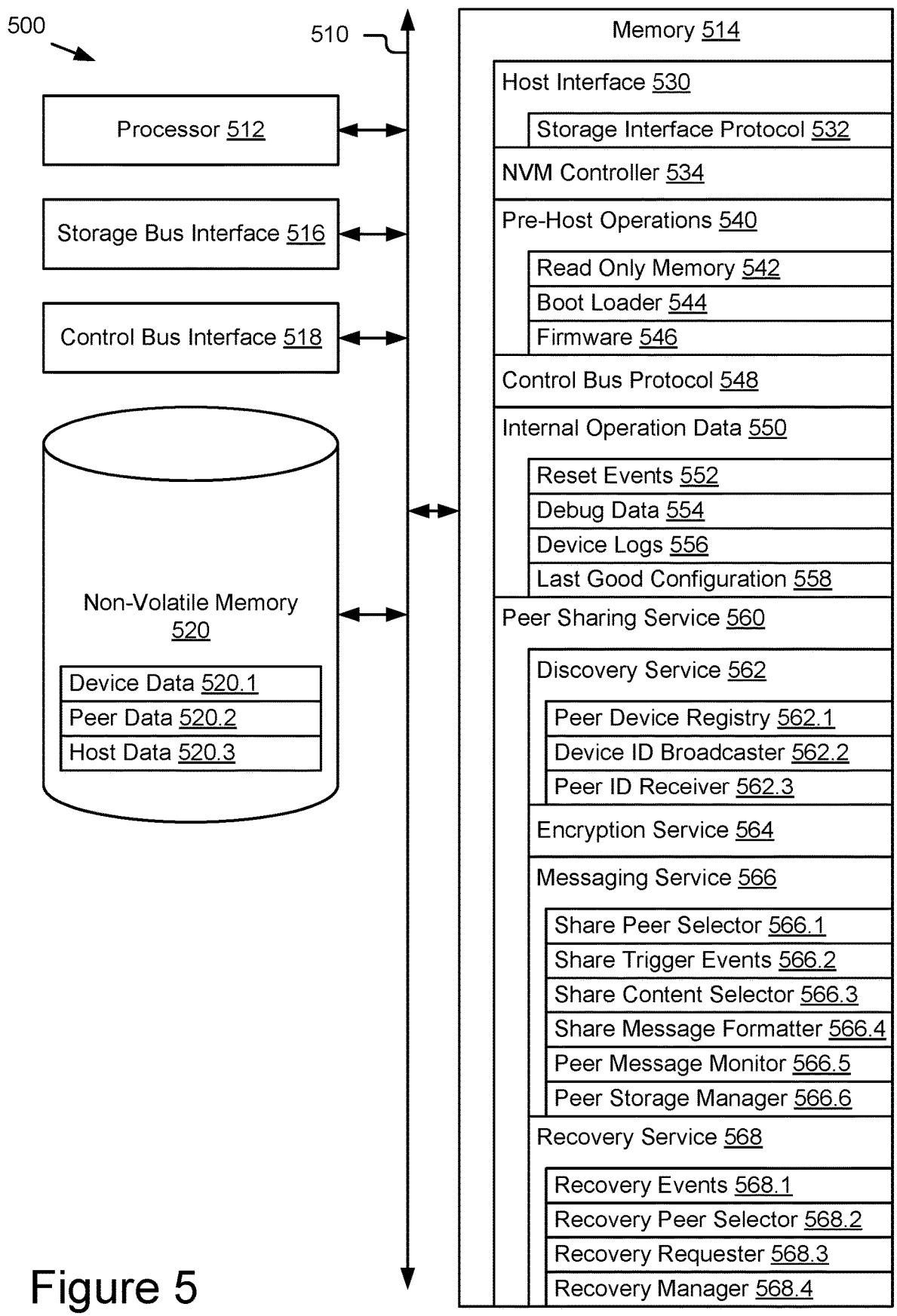
FIG. 5 schematically illustrates some elements of the storage devices of FIG. 1-5 in more detail.

FIG. 5 schematically shows selected modules of a storage device 500 configured for peer messaging, such as storage devices 120. Storage device 500 may incorporate elements and configurations similar to those shown in FIGS. 1-4. For example, storage device 500 may be configured as a storage device 120 in a set of peer storage devices interconnected by a control bus and including a host or storage bus interface for data transfer to and from a host in a multi-device data storage system.

Storage device 500 may include a bus 510 interconnecting at least one processor 512, at least one memory 514, and at least one interface, such as storage bus interface 516 and control bus interface 518. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disc or a solid state storage element.

Storage bus interface 516 may include a physical interface for connecting to a host using an interface protocol that supports storage device access. For example, storage bus interface 516 may include a PCIe, SATA, SAS, or similar storage interface connector supporting NVMe access to solid state media comprising non-volatile memory devices 520. Control bus interface 518 may include a physical interface for connecting to a control bus using a low-bandwidth interface protocol for low-level control messaging among computing components. For example. control bus interface 518 may include a I2C, I3C, SMBus, or similar bus interface connector supporting component-to-component messaging, such as multi-master, packet-based messaging over a two-wire bus.

Storage device 500 may include one or more non-volatile memory devices 520 configured to store host data. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells.

Storage device 500 may include a plurality of modules or subsystems that are stored and/or instantiated in memory 514 for execution by processor 512 as instructions or operations. For example, memory 514 may include a host interface 530 configured to receive, process, and respond to host data requests from client or host systems. Memory 514 may include a non-volatile memory (NVM) controller 534 configured to manage read and write operations to non-volatile memory devices 520. Memory 514 may include pre-host operations configured for low-level operating system and firmware functions within storage device 500 that are executed independent of host commands, particularly during device power up, initialization, power cycling, or ungraceful shutdown (UGSD). Memory 514 may include a control bus protocol configured manage communication over control bus interface 518 in accordance with a determined protocol or standard. Memory 514 may include internal operation data 550 configured to store low-level operation data for storage device 500 used for device management and troubleshooting. Memory 514 may include a peer sharing service 560 configured for communication among storage devices attached to the same control bus as storage device 500.

Host interface 530 may include an interface protocol and/or set of functions and parameters for receiving, parsing, responding to, and otherwise managing host data requests from a host. For example, host interface 530 may include functions for receiving and processing host requests for reading, writing, modifying, or otherwise manipulating data blocks and their respective client or host data and/or metadata in accordance with host communication and storage protocols. In some embodiments, host interface 530 may enable direct memory access and/or access over NVMe protocols through storage bus interface 516 to host data units 520.3 stored in non-volatile memory devices 520. For example, host interface 530 may include host communication protocols compatible with PCIe, SATA, SAS, and/or another bus interface that supports use of NVMe protocols for data access to host data 520.3.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage bus interface 516. For example, storage interface protocol 532 may include both PCIe and NVMe compliant communication, command, and syntax functions, procedures, and data structures. In some embodiments, host interface 530 may include additional modules (not shown) for command handling, buffer management, storage device management and reporting, and other host-side functions.

NVM controller 534 may include an interface protocol and/or set of functions and parameters for reading, writing, and deleting data units in non-volatile memory devices 520. For example, host interface 530 may include functions for executing host data operations related to host storage commands received through host interface 530. For example, PUT or write commands may be configured to write host data units to non-volatile memory devices 520. GET or read commands may be configured to read data from non-volatile memory devices 520. DELETE commands may be configured to delete data from non-volatile memory devices 520, or at least mark a data location for deletion until a future garbage collection or similar operation actually deletes the data or reallocates the physical storage location to another purpose. In some embodiments, NVM controller 534 may include flash translation layer (FTL) management, data state machine, read/write buffer management, NVM device interface protocols, NVM device configuration/management/maintenance, and other device-side functions. In some embodiments, NVM controller 534 may be configured to allocate a portion of the memory locations in non-volatile memory devices 520 for storing data other than host data 520.3. For example, NVM controller 534 may allocate device data 520.1 as memory locations reserved for internal device data, including device configuration, parameter, and internal operation data. In some embodiments, NVM controller 534 may allocate peer data 520.2 as memory locations reserved for internal device data received from and about peer storage devices, including internal operation data from those peer storage devices. In some embodiments, storage space allocated to device data 520.1 and/or peer data 520.2 may include device data partitions and/or peer data partitions excluded from the storage capacity made available to host data 520.3, such as overprovisioned storage locations hidden from the host for use storing internal operation data, FTL tables, replacing bad blocks, etc.

Pre-host operations 540 may include functions and parameters for managing low-level device operations for storage device 500. For example, pre-host operations 540 may include operations executed during startup or initialization of storage device 500 prior to establishing host communications through host interface 530, denoted as a pre-host operation state. In some embodiments, pre-host operations 540 may also include functions and parameters for managing low-level device operations during shutdown, power cycle, error, or failure states where host communication may become unavailable temporarily. For example, pre-host operations 540 may include read only memory, boot loader, firmware, and/or operating system operations that govern the basic operation of storage device 500 as a set of interconnected computing components and interfaces, independent of the higher-level host data storage functions.

In some embodiments, pre-host operations 540 may include a plurality of hardware and/or software modules configured to use processor 512 and memory 514 to handle or manage defined pre-host operations 540. For example, pre-host operations 540 may include a read only memory (ROM) 542 configured to provide the initial set of instructions executed by processor 512 at startup to initialize basic component detection, configuration, and communication among components on internal bus 510. Pre-host operations 540 may include a boot loader 544 configured to provide and initiate the startup or boot time tasks and processes to instantiate the operating system and/or firmware 546 for storage device 500 and its components in memory 514. Pre-host operations 540 may include firmware 546 configured to instantiate the data structures, functions, and interfaces for the components of storage device 500 to interact and execute the various functions described herein. In some embodiments, firmware 546 may include initialization of host interface 530, NVM controller 534, control bus protocol 548, and peer sharing service 560. In some embodiments, execution of read only memory 542, boot loader 544, and/or firmware 546 may generate internal operation data 550, such as reset events 552, debug data 554, device logs 556, and last good configuration data 558.

Control bus protocol 548 may include interfaces, functions, and parameters for communication within the host or an associated baseboard management controller (BMC) using multi-master discovery and messaging compliant with a low-bandwidth interface standard. For example, storage device 500 may be configured for packet-based messaging through control bus interface 518 using a low-bandwidth bus protocol, such as I2C, I3C, SMBus, etc. Control bus protocol 548 may include a plurality of hardware and/or software modules configured to use processor 512, memory 514, and control bus interface 518 for communication with host components, including peer storage devices on the same control bus, using a control bus protocol supported by the connected control bus. In some embodiments, control bus protocol 548 may provide a low-bandwidth communication channel with the host and other system components to assist with power management, discovery, and access to external resources, such as temperature sensors, fan controllers, light emitting diode (LED) indicators, etc. For example, control bus interface 518 may connect storage device 500 to a BMC for monitoring the physical state of storage device 500. In some embodiments, control bus protocol 548 may provide the discovery and messaging functions used by peer sharing service 560.

Internal operations data 550 may include data structures and related functions for instantiating data related to internal storage device operations in internal operation memory locations in memory 514 and/or device data 520.1 in non-volatile memory devices 520. For example, internal operations data 550 may include data generated by internal management processes, such as pre-host operations 540, and written to device data 520.1. In some embodiments, internal operations data 550 may include reset events 552, debug data 554, device logs 556, and/or last good configuration data 558.

For example, reset events 552 may include a reset event data set of operating state parameters for storage device 500 at the time when a reset was triggered by firmware 546 and/or a hardware or software reset initiated through control bus interface 518. Reset events 552 may include reset occurrences during ROM 542, boot loader 544, and/or firmware 546 operations. The set of operating state parameters may be pulled from registers or other data structures in memory 514 representing the current operating state of storage device 500 and stored to device data 520.1 during the reset operation. Debug data 554 may include a set of state parameters, trace data, or similar debug output generated by any failed process or service within storage device 500. For example, debug data 554 may include process parameters representing the state of storage device 500 and/or any process therein before a fatal assert or crash occurs. Device logs 556 may include one or more sets of operating parameters related to internal operations that are recorded over time (and generally organized by timestamp) in operation log data and may represent processes operating in storage device 500 regardless of error, failure, or power cycling states. In some embodiments, device logs 556 may include a power mode log that includes power mode changes, such as entry into a low power mode and/or return to normal power mode. Last good configuration data 558 may include a set of configuration parameters in use when storage device 500 was last started and/or operated normally. For example, last good configuration data 558 may include parameters describing a last good page written by storage device 500 and/or the last firmware update processed for a stable configuration in a last good configuration data page. In some embodiments, last good page written data and/or a stable firmware version may need to be found and loaded as part of a device recovery process during initialization or power cycling. For example, a storage device that is recovering may be configured to query peer storage devices for firmware field updates, recovery the most current version (by comparing version numbers associated with the storage device current firmware version/updates and the firmware version/updates available from peer devices), and use it for the recovery process. In some embodiments, the most recent firmware version may not be the prior firmware version used by the device, but a firmware field update that was released while the storage device was offline or otherwise incapable of receiving updates and/or successfully installing such updates.

Peer sharing service 560 may include an interface protocol and set of functions and parameters for discovering peer storage devices, sending and receiving messages with those peer storage devices, and/or recovering data from those peer storage devices. For example, peer sharing service 560 may include functions for utilizing low-bandwidth communications through control bus interface 518 using control bus protocol 548. In some embodiments, peer sharing service 560 may include management of peer data 520.2 in non-volatile memory devices 520 for storing peer internal operation data and/or may support data encryption for encrypting internal operation data in transit and/or storing peer data 520.2 in an encrypted state.

In some embodiments, peer sharing service 560 may include a plurality of hardware and/or software modules configured to use processor 512 and memory 514 to handle or manage defined operations of peer sharing service 560. For example, peer sharing service 560 may include a discovery service 562, an encryption service 564, a messaging service 566, and/or a recovery service 568. For example, discovery service 562 may be configured to discover peer storage devices on a shared control bus and store their addresses for use by messaging service 566 and/or recovery service 568. Encryption service 564 may be configured to encrypt and/or decrypt payload data for messaging service 566 for transit, storage to peer data 520.2, and/or recovery and storage to device data 520.1. Messaging service 566 may be configured to send and receive one-to-one and/or broadcast messages to and from peer storage devices over the shared control bus. Recovery service 568 may be configured to request and receive data from peer storage devices to assist with recovery tasks for storage device 500.

Discovery service 562 may include data structures, functions, and interfaces for discovering peer devices on a control bus and determining peer device addresses for use by peer sharing service 560. For example, during initialization or startup of storage device 500, discovery service 562 may broadcast its device identifier or address and receive similar broadcasts from other devices to accumulate device information for other devices on the control bus. In some embodiments, discovery service 562 may include a peer device registry 562.1 configured to store storage device identifiers, control bus addresses, and/or other peer storage device information to establish and support communication with peer storage devices. For example, peer device registry 562.1 may include a data table or other data structure in memory 514 and/or device data 520.1 that includes a plurality of device identifier entries associated with corresponding control bus addresses. In some embodiments, discovery service 562 may include a device ID broadcaster 562.2 configured to determine the storage device identifier and/or control bus address for storage device 500 and broadcast a message on the control bus to enable other devices on the control bus to discover storage device 500. For example, device ID broadcaster 562.2 may be triggered during ROM, boot loader, or firmware execution at startup or initialization of storage device 500, in response to a discovery message from another device, and/or another device discovery trigger in accordance with control bus protocol 548. In some embodiments, discovery service 562 may include a peer ID receiver 562.3 configured to monitor communications through control bus interface 518, identify discovery broadcasts from other storage devices, and add a corresponding device identifier entry in peer device registry 520.1. For example, control bus protocol 548 may define syntax for broadcast messages, such as a broadcast address, a tag or similar parameter for designating a discovery broadcast, and data payload including the storage device identifier, control bus address, vendor identifier, etc. and peer ID receiver 562.3 may be configured according to parse messages meeting that syntax to extract peer storage device identifiers.

Encryption service 564 may include data structures, functions, and interfaces for encrypting and decrypting internal operation data 550 for sharing and/or storage. For example, encryption service 564 may include encryption key exchange with peer storage devices to establish encrypted messaging between peer storage devices and/or local-only encryption to enable encrypted internal operation data to be shared and/or stored, with only the source peer storage device capable of decrypting the encrypted data. In some embodiments, as internal operations in storage device 500 generate internal operation data 550, selected internal operation data may be encrypted by encryption service 564 and stored in device data 520.1 and/or sent to peer storage devices through messaging service 566. Messaging service 566 may send the encryption key to the peer storage device to enable decryption of the encrypted data payload by the peer storage device, prior to storing as peer data or upon subsequent access of peer data. In some embodiments, encryption service 564 may implement a selected encryption algorithm and standard for target internal operations data, such as advanced encryption standard (AES)-128 or another encryption standard.

Messaging service 566 may include data structures, functions, and interfaces for sending and receiving messages to and from peer devices over the control bus. For example, messaging service 566 may implement control bus protocol 548 to send and receive messages with other devices identified through discovery service 562. In some embodiments, messaging service 566 may send packetized data payloads over the control bus using block write and block read commands between buffers in the peer storage devices.

In some embodiments, messaging service 566 may include a share peer selector 566.1 configured to select a target or destination peer storage device to receive a message. For example, share peer selector 566.1 may include a parameter setting or algorithm for selecting a peer storage device to receive a particular set of internal operation data, such as a selected peer storage device for offloading or backing up storage device 500 or an algorithm (randomizer, round-robin, etc.) for distributing internal operation data among peer storage devices. In some embodiments, messaging service 566 may include share trigger events 566.2 configured to determine when selected internal operation data is sent to one or more peer storage devices. For example, share trigger events 566.2 may include a plurality of rule-based conditions for triggering offload of internal operation data, such as reset events, operation errors, power mode changes, successful startup, storing a good page, ungraceful shutdown, periodic backup schedule, etc. In some embodiments, messaging service 566 may include a share content selector 566.3 configured to select the set of internal operation data to be offloaded through messaging service 566. For example, share content selector 566.3 may include a set of parameters for determining internal operation data types and ranges to be sent to a peer storage device. Where multiple share trigger events 566.2 and/or internal operation data types are supported by peer sharing service 560, a particular share trigger event may determine the internal operation data type and extent offloaded, such as the debug data for a triggering operation failure, a defined time window of device log data for a periodic trigger, the content of a most recent firmware update or last good page for a successful operation, etc. In some embodiments, messaging service 566 may include a share message formatter 566.4 configured to format a peer message in accordance with control bus protocol 548 to include the control bus address of the target peer storage device and the selected content in the data payload. For example, share message formatter 566.4 may generate or determine a header containing a control bus address and a read/write flag, followed by message payload and/or other parameters, such as command codes and/or error codes, to convey the selected internal operation data.

In some embodiments, messaging service 566 may include a peer message monitor 566.5 configured to monitor control bus interface 518 for messages from peer storage devices addressed to storage device 500 (directly or via broadcast). For example, peer message monitor 566.5 may receive peer messages over the control bus that are initiated by peer storage devices and/or responsive to messages sent by messaging service 566. Peer message monitor 566.5 may parse received messages to determine whether further action is necessary, such as passing peer data to peer storage manager 566.6 or passing recovery requests or recovery data to recovery service 568. In some embodiments, messaging service 566 may include a peer storage manager 566.6 configured to store peer data received from peer storage devices for offloading or backup. For example, peer storage manager 566.6 may receive internal operation data from one or more peer storage devices and store the data in peer data 520.2. In some embodiments, peer storage manager 566.6 may maintain a reference table or similar data structure for locating peer data by storage device identifier, internal operation data type, and other parameters to support selective retrieval of peer data when requested. In some embodiments, peer storage manager 566.6 may also maintain a reference table or similar data structure indicating which peer storage devices have received offloaded internal operation data 550 from storage device 500.

Recovery service 568 may include data structures, functions, and interfaces for recovering internal operation data from peer devices over the control bus for use in a recovery operation. For example, recovery service 568 may be initiated during startup or power cycle following an ungraceful shut down to request lost, corrupted, or untrustworthy internal operation data from a peer storage device to which it was previously offloaded.

In some embodiments, recovery service 568 may include recovery events 568.1 configured to determine when previously offloaded data should be recovered for use by storage device 500. For example, recovery events 568.1 may include a rules-based set of event conditions or parameters that trigger search and retrieval of offloaded internal operation data, such as startup after an ungraceful shutdown, power cycling, power mode change, or selected error condition. In some embodiments, storage device 500 may initiate peer recovery features upon install, even without a reset event. For example, storage device 500 may be equipped with a plug and play feature that searches for firmware updates from peer storage devices and "recovers" the most recent compatible firmware update. In some embodiments, recovery service 568 may include a recovery peer selector 568.2 configured to determine the peer storage device containing the target recovery data (or previously offloaded internal operation data). For example, peer selector 568.2 may use peer storage manager 566.6 to identify the peer storage device or devices to which the desired recovery data was offloaded, if known. In some embodiments, which peer storage device includes the desired recovery data may not be known to storage device 500 and peer selector 568.2 may be configured to use recovery requester 568.3 to poll the peer storage devices to determine whether any of them contain the desired recovery data. For example, recovery requester 568.3 may send recovery requests to a plurality of peer storage devices, to which any peer storage device containing the recovery data may respond with the recovery data. In some embodiments, an initial polling request may be sent by messaging service 566 (or recovery requester 568.3), responsive messages may indicate whether and to what extent each peer storage device contains some or all of the data, and peer selector 568.2 may use the responses to determine which peer storage devices should receive recovery requests. In some embodiments, recovery service 568 may include a recovery requester 568.3 configured to send a recovery request message to one or more peer storage devices over the control bus. For example, recovery requester 568.3 may use messaging service 566 to send a recovery message to a recovery peer storage device containing some or all of the desired recovery data. The recovery request may identify the specific set of internal operation data desired for recovery operations in the data payload and/or include a command code or process call configured to request the target recovery data. In some embodiments, recovery service 568 may include a recovery manager 568.4 configured to receive responsive recovery data from peer storage devices and store the received recovery data to memory 514 and/or device data 520.1 for use in completing the recovery operation. For example, recovery data received by messaging service 566 may be forwarded to recovery manager 568.4 and recovery manager 568.4 may determine one or more storage locations in device data 520.1 for the recovered internal operation data. Once the recovered internal operations data is returned to device data 520.1, it may be used by storage device 500 to complete recovery operations, such as pre-host operations 540 or other recovery from an ungraceful shut down or operation error.

Figure 6:
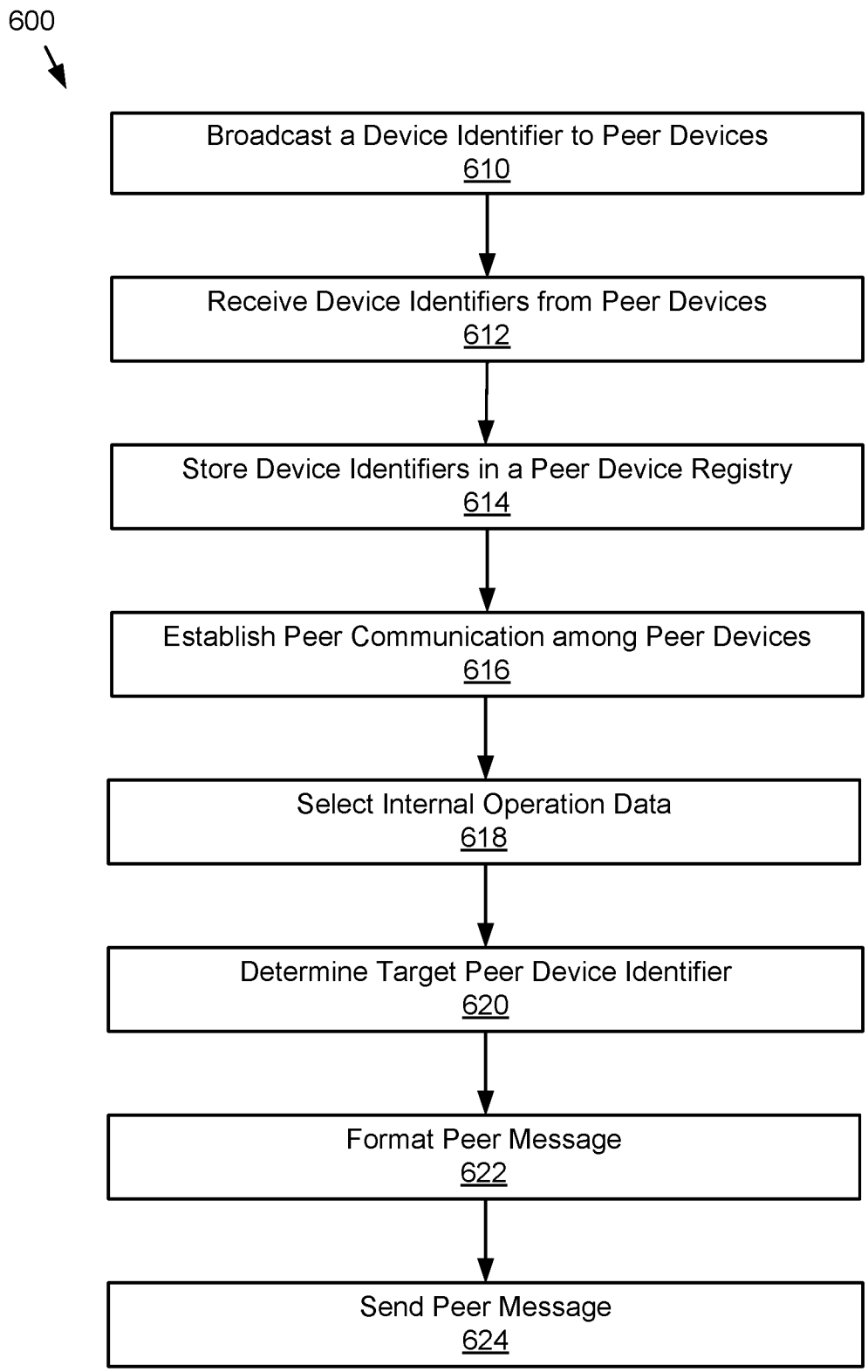
FIG. 6 is a flowchart of an example method of sending peer messages among peer storage devices using a control bus.

As shown in FIG. 6, storage device 500 may be operated according to an example method for sending peer messages among peer storage devices using a control bus, i.e. according to method 600 illustrated by blocks 610-624 in FIG. 6.

At block 610, a device identifier may be broadcast to peer devices over a control bus. For example, a discovery service complying with the control bus protocol may send a broadcast message identifying the storage device and its control bus address.

At block 612, device identifiers may be received from peer devices over the control bus. For example, the discovery service may also receive broadcast messages identifying other storage devices on the same control bus, along with their control bus addresses. These peer discovery messages may be received responsive to the storage device's broadcast at block 610, initiated as part of the startup or initialization of each peer storage device, and/or based on a master discovery trigger or broadcast.

At block 614, device identifiers from the peer devices may be stored in a peer device registry of the storage device. For example, the discovery service may store storage device identifiers, control bus addresses, and/or other information related to each peer storage device in a peer storage device entry in the peer device registry.

At block 616, peer communication may be established among the peer storage devices. For example, the peer device registry may contain the information necessary for addressing messages to peer storage devices and a peer messaging service may be configured to send broadcast and/or direct messages to the peer storage device using the control bus protocol.

At block 618, internal operation data may be selected for offloading by the storage device. For example, the messaging service may select a set of internal operation data based on one or more share trigger conditions or events.

At block 620, a target peer device may be determined for the offload message. For example, the messaging service may select one or more peer storage devices from the peer device registry to receive the selected internal operation data.

At block 622, a peer message may be formatted to comply with the control bus protocol. For example, the messaging service may package the selected internal operation data as the data payload in one or more peer messages with appropriate address headers for the target peer storage device.

At block 624, the peer message may be sent from the storage device that generated the internal operation data to a peer storage device over the control bus. For example, the messaging service may send the peer message generated at block 622 through a control bus interface.

Figure 7:
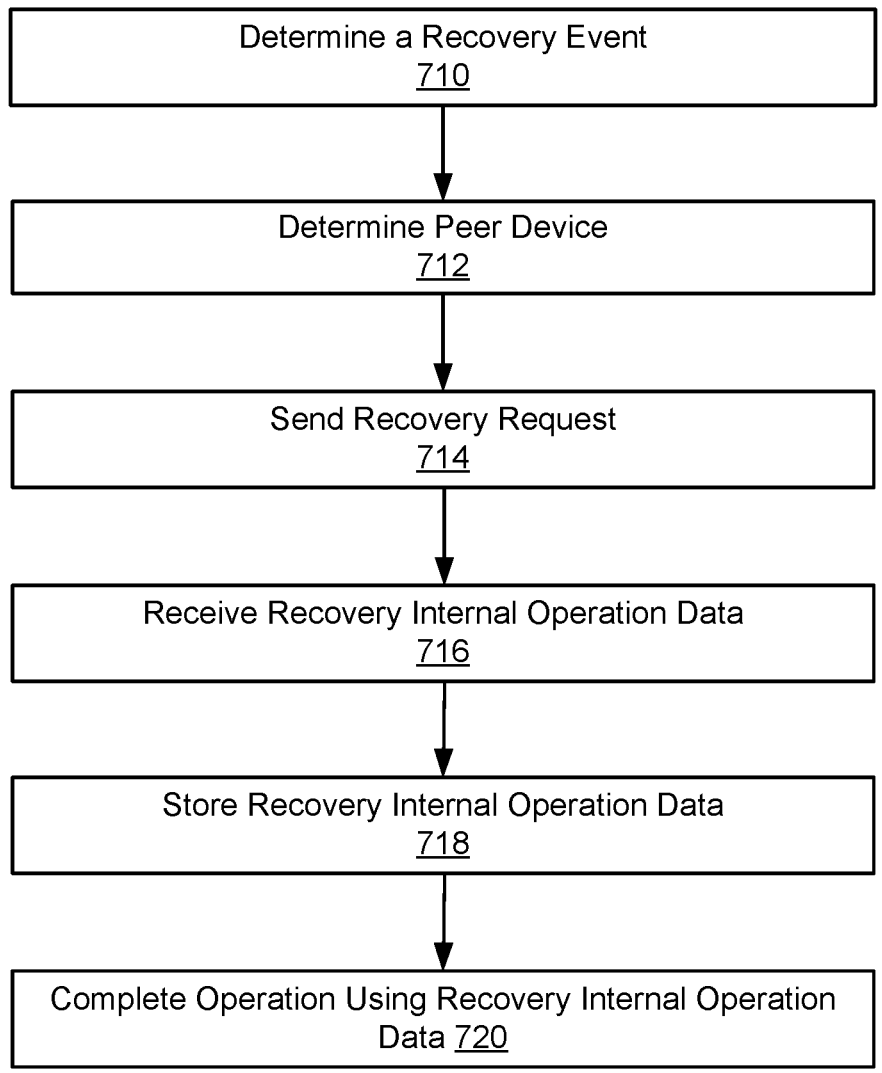
FIG. 7 is a flowchart of an example method of recovering internal operation data from a peer storage device.

As shown in FIG. 7, storage device 500 may be operated according to an example method for recovering internal operation data from a peer storage device, i.e. according to method 700 illustrated by blocks 710-720 in FIG. 7.

At block 710, a recovery event may be determined. For example, a recovery service of a storage device that previously offloaded internal operation data to peer storage devices may detect a recovery event, such as startup after an ungraceful shut down, power cycle, or power mode change.

At block 712, a peer device may be determined. For example, the recovery service may determine peer storage devices that may have received the desired recovery data and select one or more corresponding peer storage devices to receive a recovery request.

At block 714, the recovery request may be sent to one or more peer storage devices. For example, the recovery service may format and send a recovery request specifying the internal operation data needed for recovery.

At block 716, the recovery internal operation data may be received. For example, the recovery service may receive one or more response messages from peer storage devices receiving the recovery requests. The recovery response messages may include some or all of the recovery internal operation data requested in the recovery requests.

At block 718, recovery internal operation data may be stored. For example, the recovery service may store the internal operation data recovered from peer storage devices to a device data store for the internal operation data of the storage device, such as in the storage location from which the internal operation data was missing, corrupted, or unreliable.

At block 720, an operation may be completed using the recovery internal operation data. For example, the storage device may complete one or more internal operations, such as ROM, bootloader, or firmware processes for startup, error recovery, power mode change, etc., using the internal operation data recovered from peer storage devices.

Figure 8:
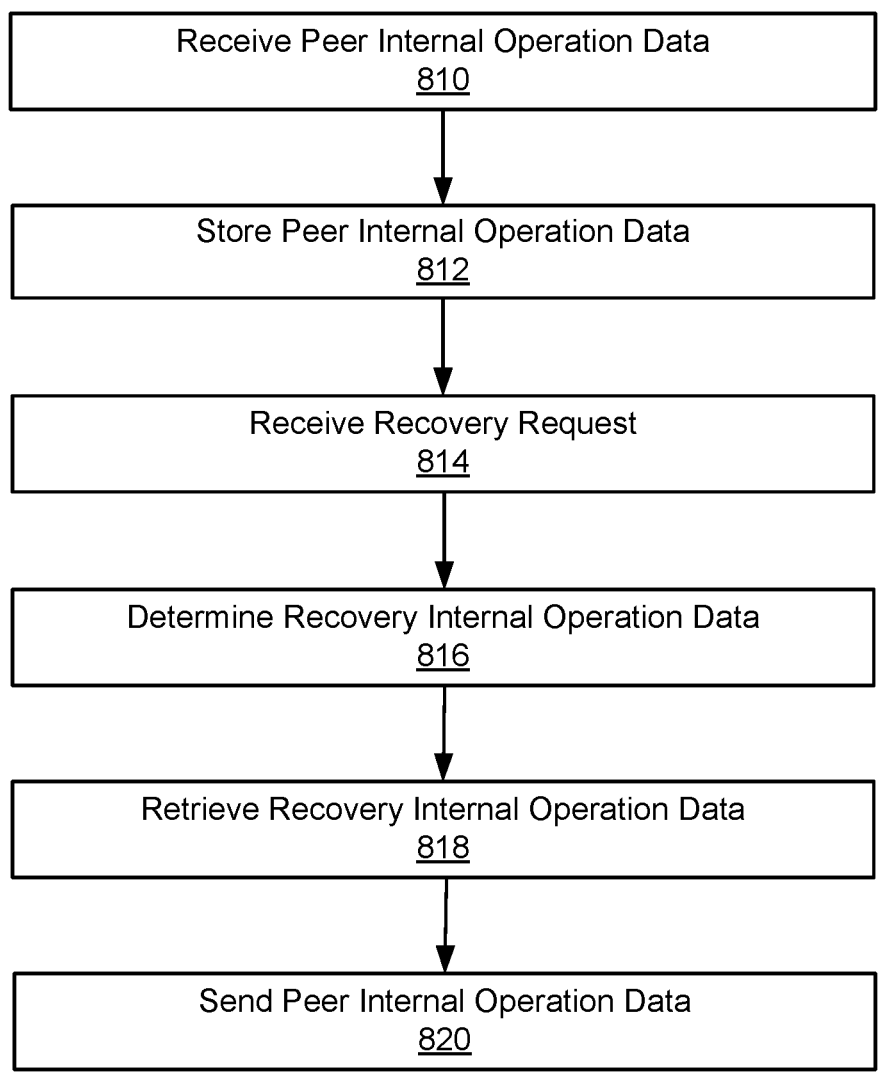
FIG. 8 is a flowchart of an example method of supporting peer recovery of internal operation data.

As shown in FIG. 8, storage device 500 may be operated according to an example method for supporting peer recovery of internal operation data, i.e. according to method 800 illustrated by blocks 810-820 in FIG. 8.

At block 810, peer internal operation data may be received from a peer storage device. For example, a messaging service may receive a peer message offloading internal operation data to the receiving storage device.

At block 812, the peer internal operation data may be stored by the receiving storage device. For example, the storage device may include storage space allocated to storing peer internal operation data and store the received peer internal operation data with metadata sufficient to identify, retrieve, and associate the stored peer internal operation with the peer storage device from which it originated.

At block 814, a recovery request may be received. For example, the messaging service may receive a peer message and identify it as a recovery request containing parameters describing internal operation data needed for recovery.

At block 816, the recovery internal operation data may be determined. For example, a peer storage manager may use the recovery request parameters to determine the scope of requested internal operation data in peer data.

At block 818, the recovery internal operation data may be retrieved. For example, the peer storage manager may retrieve whatever portion of the requested recovery internal operation data is stored in peer data in the storage device.

At block 820, the peer internal operation data may be sent. For example, the messaging service may send one or more response messages including the recovery internal operation data retrieved at block 818 to the peer storage device that sent the recovery request.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a first device comprising:
   a processor;
   a memory;
   a host interface configured to connect to a host system;
   a control bus interface configured to connect to a control bus, wherein:
      the host interface has a bandwidth higher than the control bus interface;
      the control bus interface is configured to use a different communication protocol than a storage interface protocol of the host interface; and
      each peer device of a plurality of peer devices is configured to connect to the control bus; and
   a peer sharing service configured to:
      establish, through the control bus interface, peer communication with a target peer device from the plurality of peer devices;
      select internal operation data for the first device;
      send the selected internal operation data to the target peer device; and
      receive, responsive to a recovery event, the selected internal operation data from the target peer device.

2. The system of claim 1, wherein the first device further comprises:
   a storage medium configured to store host data received through the host interface;
   a storage interface protocol configured for communication with the host system through the host interface; and
   a non-volatile memory device controller configured to manage data input/output to the storage medium.

3. The system of claim 2, wherein:
   the storage medium comprises at least one non-volatile memory device;
   the storage interface protocol is a non-volatile memory express (NVMe) protocol;
   the plurality of peer devices includes a plurality of peer storage devices; and
   each peer storage device of the plurality of peer storage devices comprises:
      a peer host interface configured to connect to the host system using the NVMe protocol;
      a peer storage medium comprising at least one non-volatile memory; and
      a peer control bus interface configured to connect to the control bus.

4. The system of claim 1, wherein the peer sharing service comprises a discovery service configured to:
   broadcast, through the control bus interface, a device identifier for the first device;
   receive, through the control bus interface, peer device identifiers from the plurality of peer devices; and
   store the peer device identifiers in a peer device registry.

5. The system of claim 1, wherein:
   the peer sharing service is further configured to:
      determine a peer device identifier for the target peer device; and
      format a peer message including the selected internal operation data as a message payload; and
   sending the selected internal operation data includes sending, using the peer device identifier for addressing, the peer message to the target peer device.

6. The system of claim 5, wherein the peer sharing service comprises an encryption service configured to encrypt, prior to sending the peer message, the selected internal operation data.

7. The system of claim 1, wherein the internal operation data is selected from:
   reset event data;
   debug data;
   device operation log data; or
   last good configuration data.

8. The system of claim 1, wherein the peer sharing service is further configured to:
   receive, through the control bus interface, peer internal operation data from at least one peer device of the plurality of peer devices;
   store the peer internal operation data in a peer data partition in the memory; and
   send, responsive to a peer recovery event, the peer internal operation data to the at least one peer device.

9. The system of claim 1, further comprising the plurality of peer devices, wherein:
   the plurality of peer devices is configured to store the internal operation data received from the first device; and
   the peer sharing service further comprises a recovery service configured to:
   determine the recovery event;
   send, responsive to the recovery event and through the control bus interface, a recovery request to at least one peer device from the plurality of peer devices;
   receive, from the at least one peer device, recovery internal operation data; and
   store, in an internal operation memory location, the recovery internal operation data.

10. The system of claim 9, wherein:
the recovery event occurs in a pre-host operation state;
the recovery internal operation data includes a last good configuration data page; and
the first device is further configured to complete pre-host operations using the last good configuration data page received from the at least one peer device.

11. A computer-implemented method, comprising:
establishing, from a first device, peer communication with a target peer device from a plurality of peer devices, wherein:

the first device and each peer device of the plurality of peer devices include:
a host interface configured to connect to a host system; and
a control bus interface configured to connect to a control bus;
the host interface has a bandwidth higher than the control bus interface; and
the control bus interface is configured to use a different communication protocol than a storage interface protocol of the host interface;
selecting internal operation data for the first device;
sending, from the first device and through the control bus interface, the selected internal operation data to the target peer device; and
receiving, at the first device and through the control bus interface, the selected internal operation data from the target peer device, wherein receiving the selected internal operation data is responsive to a recovery event.

12. The computer-implemented method of claim 11, wherein the first device and each peer device of the plurality of peer devices include:
a storage medium configured to store host data received through the host interface;
a storage interface protocol configured for communication with the host system through the host interface; and
a non-volatile memory device controller configured to manage data input/output to the storage medium.

13. The computer-implemented method of claim 11, further comprising:
broadcasting, through the control bus interface, a device identifier for the first device;
receiving, through the control bus interface, peer device identifiers from the plurality of peer devices; and
storing, in the first device, the peer device identifiers in a peer device registry.

14. The computer-implemented method of claim 11, further comprising:
determining, by the first device, a peer device identifier for the target peer device; and
formatting a peer message including the selected internal operation data as a message payload, wherein sending the selected internal operation data includes sending, using the peer device identifier for addressing, the peer message to the target peer device.

15. The computer-implemented method of claim 14, further comprising:
encrypting, prior to sending the peer message, the selected internal operation data.

16. The computer-implemented method of claim 11, wherein the internal operation data is selected from:
reset event data;
debug data;
device operation log data; or
last good configuration data.

17. The computer-implemented method of claim 11, further comprising:

receiving, at the first device and through the control bus interface, peer internal operation data from at least one peer device of the plurality of peer devices;
storing, in a memory of the first device, the peer internal operation data in a peer data partition in the memory; and
sending, by the first device and responsive to a peer recovery event, the peer internal operation data to the at least one peer device.

18. The computer-implemented method of claim 11, further comprising:
determining, by the first device, the recovery event;
sending, responsive to the recovery event and through the control bus interface, a recovery request to at least one peer device from the plurality of peer devices;
receiving, from the at least one peer device and through the control bus interface, recovery internal operation data; and
storing, in an internal operation memory location, the recovery internal operation data.

19. The computer-implemented method of claim 11, further comprising:
completing, by the first device, pre-host operations using a last good configuration data page received from the target peer device, wherein:
the recovery event occurs in a pre-host operation state; and
the selected internal operation data includes the last good configuration data page.

20. A storage system, comprising:
a control bus; and
a plurality of peer storage devices, wherein each peer storage device of the plurality of peer storage devices comprises:
a processor;
a memory;
a host interface configured to connect to a host system;
a control bus interface configured to connect to the control bus, wherein:
the host interface has a bandwidth higher than the control bus interface; and
the control bus interface is configured to use a different communication protocol than a storage interface protocol of the host interface;
means for establishing, through the control bus interface, peer communication among the plurality of peer storage devices;
means for selecting internal operation data from an internal operation memory location;
means for sending the selected internal operation data to at least one other peer storage device in the plurality of peer storage device; and
means for receiving, responsive to a recovery event, the selected internal operation data from the at least one other peer storage device in the plurality of peer storage devices.

* * * * *